Dec. 7, 1926.

C. C. CARPENTER

INDENTURING MACHINE

Filed July 9, 1923

Inventor
Clyde C. Carpenter
by /H.C. Patters/ Att'y

Dec. 7, 1926.
C. C. CARPENTER
1,609,461
INDENTURING MACHINE
Filed July 9, 1923   2 Sheets-Sheet 2
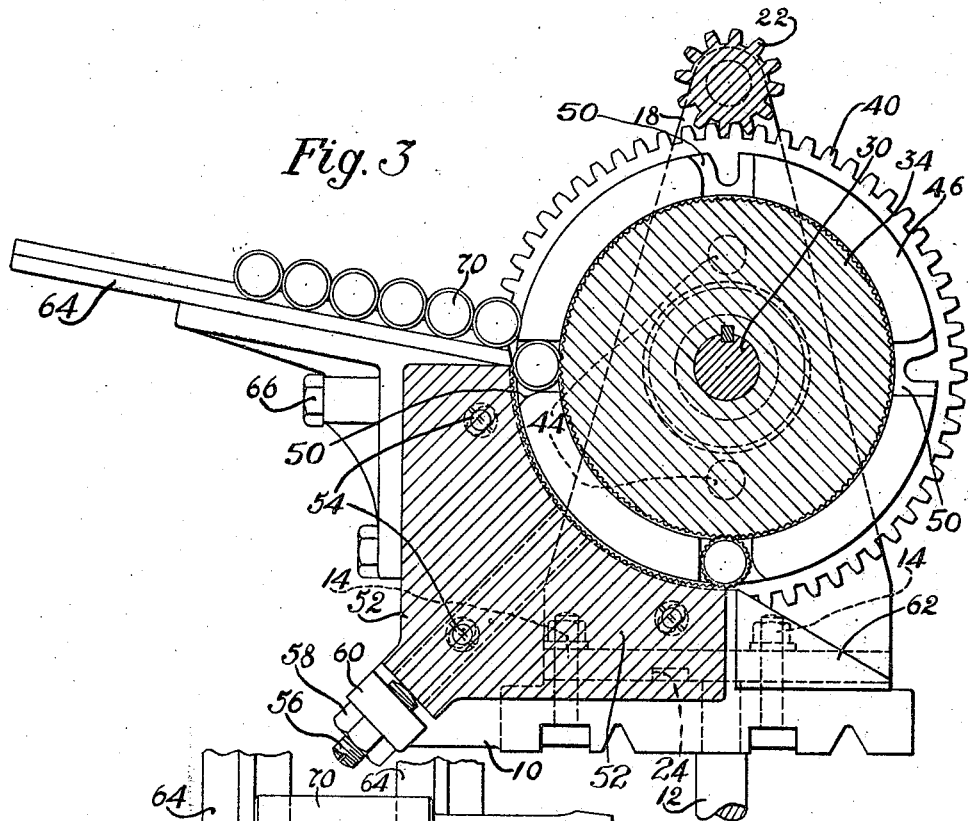
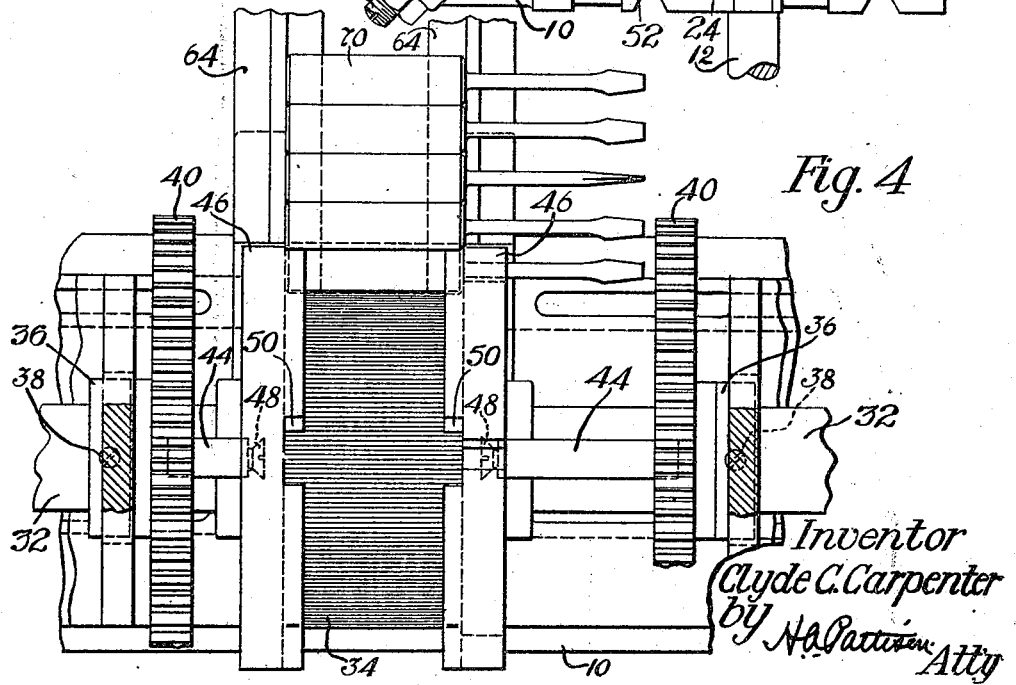
Inventor
Clyde C. Carpenter
by H. A. Pattison Atty Patented Dec. 7, 1926.

1,609,461

UNITED STATES PATENT OFFICE.

CLYDE CONVERSE CARPENTER, OF CHICAGO, ILLINOIS, ASSIGNOR TO WESTERN ELECTRIC COMPANY, INCORPORATED, OF NEW YORK, N. Y., A CORPORATION OF NEW YORK.

INDENTURING MACHINE.

Application filed July 9, 1923. Serial No. 650,297.

This invention relates to indenturing machines, and more particularly to a machine for indenturing articles which are capable of being rolled.

Where it is desired to indent a large part of the surface of an article by rolling it between indenturing dies, it is desirable to keep its axis of rotation parallel to that of the indenturing member, when that member is rotatable. Also, it is often required to indent part of an object only, which part may be itself rollable, but the article may have some peculiar feature of construction, such as a projection, which would interfere with its free rotation, or with means for guiding it through a machine.

An object of the present invention is to indent any part, or all, of the peripheral surface of a rollable article.

Another object is to improve, and amplify the range of use of, an indenturing machine.

In order to attain these objects, there is provided, in accordance with one feature of the invention, a fixed and a movable indenturing member, and work holders which are held in alignment by means of gears.

These, and other features of the invention not specifically mentioned, will appear from the following description and the accompanying drawings, in which—

Fig. 3 shows a section on the line 3—3 of Fig. 1, and

Fig. 4 is a plan view of the mechanism with parts, including the idler gear, broken away.

In referring to the drawings in detail, the same number will be used to designate the same part throughout, but where a part on one side of the structure is virtually the same as the corresponding part on the other, the same character will be used to denote both.

Figure 1:
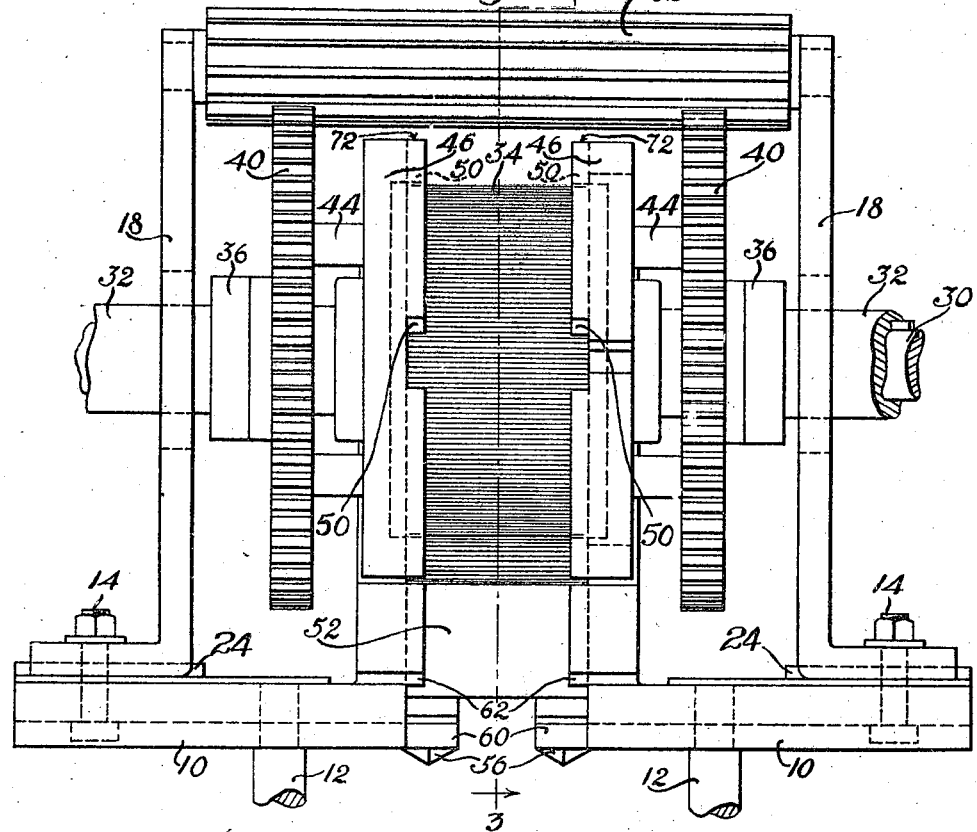
Figure 1 is a view in front elevation of a device made in accordance with one embodiment of the invention and adapted to mount on a lathe or other suitable machine.
Figure 2:
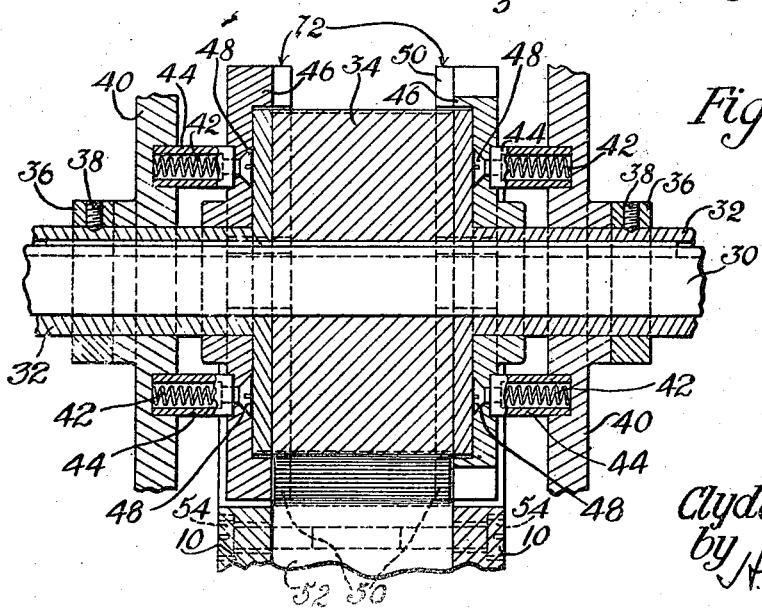
Fig. 2 shows a vertical, longitudinal section of a part of Fig. 1.

Although the embodiment of the invention shown in the drawing is particularly adapted for indenturing or "knurling" solid stock, the invention is susceptible of other uses and is to be limited only by the spirit and scope of the appended claims.

An arbor 30 may be mounted so that one end is driven by the spindle of a machine, such as a lathe or milling machine (not shown), while the other end thereof may be rotatably supported by a center, or a head rest, as is customary in such machines.

Mounted upon this arbor, and keyed to it, are bushings 32 on either side of a rotatable indenturing member 34 which is also carried by, and keyed to, the arbor 30.

Riding upon the bushings 32 are guide members 46, which are discoid members of metal having an annular flange 72 projecting from the inner face of each, and depressions 50 in their peripheries to hold blanks during their indenturing. In two depressions in the outer face of each guide member are affixed tubular spacing members 44, by means of screws 48. Within each of these spacing members is a coiled spring 42, which is compressed, upon assembly, by gears 40, which also ride upon the bushing 32 and are held in place by collars 36 which are secured to the bushings 32 by set screws 38. The spacers seat in holes drilled in the faces of the gears to receive them. It is apparent that this method of construction will cause the guide members 46 to be forced into intimate contact with the plates of the bushings 32 by the action of the springs 42, and give a friction drive between these two members.

A fixed die 52, or indenturing member, the upper surface of which is an arcuate depression which may be indentured and hardened, is supported on either side by the parallel vertical faces of two members 10, which are connected to the fixed indenturing member 52 by means of screws 54, riding in elongated holes in member 10.

Means for adjusting the position of member 52 is provided in screws 56, which screw into holes drilled and tapped in projections 60 extending from members 10, these screws being supplied with locknuts 58 for securing them after adjustment. The holes in projections 60 are drilled so that their center lines are on radii from the axis of the arbor 30.

The horizontal portions of members 10 are provided with means to affix them to the bed of the dominant machine, where the device is used with such a machine, and may consist of bed bolts 12. It is apparent that the mechanism may be made complete in itself by supplying suitable supporting means, and motive power for the arbor. Upright supports 18 for an idler gear 22 are connected to members 10 by bolts 14, the heads of which ride in longitudinal grooves in the bottom of plate 10, the gear 10 extends across the machine and meshes with both gears 40 and serves to keep these gears in step, and since they are secured to the sleeves 32 carrying discoid guide members 46 serves likewise to keep the depressions 50 of such guide members in perfect alignment, the upright members 18 may be of a solid piece of metal with a hole drilled in each, the center of the hole being at the height of the center of the arbor from the bed of the machine to allow the passage therethrough of the arbor 30, the diameter of said holes being greater than that of the collars 36 so as to clear them when the machine is set up as in Fig. 4. The base portion of these upright members is at right angles to the rest, and on the lower side of the base of each is cut a groove, which rides on a guide ridge 24 to align these members, and thus insure alignment of the bearings which they support.

Extending from the face of the vertical portion of each of the members 10 is a triangular projection 62, which serves to carry the indentured articles free of the machine when they drop from the depressions in the field members after clearing the lower edge of the arcuate depression in the fixed indenturing member.

On the rear of each of the vertical portions of the members 10, by means of bolts 66, are affixed members 64, which form a chute down which are fed the blanks to be indented.

In operating the device, there are assembled upon an arbor 30, in the manner previously described, a rotatable indenturing member 34, bushings 32, guide members 46, gears 40, and collars 36. The length of the spacers, the size of the depressions in the guide members, the size and shape of the indenturing members, as well as the nature of the indenturing surfaces, are to be determined by the requirements of the work to be performed.

A fixed indenturing member 52 is then loosely assembled with the members 10 and these members are affixed to the bed of the machine by the bolts 12.

Slipping an upright bearing member over each end of the arbor 30 it is then mounted in the dominant machine as described above, and the clearance between the indenturing members is adjusted by means of the screws 56 and affixed by the lock-nuts 58. The idler gear 22 is then put in place and the upright bearing support members 18 are secured in place by the bolts 14.

After placing a supply of blanks 70 in the feed chute, the device may be operated by starting the machine with which it is associated, the blanks 70 are illustrated as comprising screw drivers, the handles of which are made of solid stock and are knurled throughout their length during the operation of the machine. The feed members will be revolved by the friction drive and as a depression 50 presents itself to the bottommost blank in the feed chute, the blank drops into the depression and is carried down by the feed members which are rotated by the friction drive between the plate 32 and the indenturing members.

As the blank is gripped between the two indenturing members, it is advanced by being rolled between them, although it is still held in alignment by the guide members, since the flange extending from the face of each of the members projects into the space between the indenturing members, thus making it possible to employ an indenturing member as long as the article without interference from the guide means. In accordance with a well known principle of rolling objects, the rate of advance of the object is only one-half the tangential speed of its periphery, hence there must be a slippage between the bushing plate 32, which is rotating at the same rate as the indenturing member, and the guide members 46, which must travel at the speed of the blank, and this slippage is permitted by the friction drive between the guide members and the plates of the bushings. When the blank, which is by then fully indentured, clears the lower end of the arcuate surface of the fixed die, it drops onto the slanting upper surfaces of projections 62, which carry it down and away from the machine into any suitable storage receptacle (not shown).

What is claimed is:

1. In a machine for making indentures, a rotary indenturing member, a blank supporting element associated therewith, and a pair of guiding devices mounted at opposite sides of said indenturing member.

2. In a machine for making indentures, a rotary indenturing member, a blank support associated therewith, and a pair of rotary guiding members mounted at opposite sides of the indenturing member.

3. In a machine for making indentures, a rotary indenturing member, a blank supporting element co-operating therewith, a pair of rotary blank feeding members mounted co-axially with respect to the indenturing member and at opposite sides thereof, and a frictional driving connection between the indenturing member and said guide devices.

4. In a machine for making indentures, an indenturing member, means for rolling an article across the indenturing member to indent the article, a plurality of discoid members, each having an annular flange projecting over the indenturing member, depressions in the peripheries of said discoid members to guide an article during indenturing, and means to maintain alignment of said depressions.

5. In a machine for making indentures, an indenturing member, means for rolling an article across the indenturing member to indent the article, discoid members associated with the indenturing member and having depressions in their peripheries to guide an article during indenturing, an idler gear having a driven connection with each guiding member, and an idler gear meshing with these gears to maintain alignment of said depressions.

6. In a machine for making indentures, an indenturing member, means for rolling an article across the indenturing member to indent the article, discoid guiding members associated with the indenturing members, having depressions in their peripheries to guide an article during indenturing, a gear associated with each guiding member, tubular spacing members between each guiding member and its associated gear, a spring within each spacing member to force the guiding member inward, and an idler gear to mesh with the aforesaid gears to hold the depressions in alignment.

7. In a machine for making indentures, an indenturing member, means for rolling an article across the indenturing member to indent the article, discoid guiding members having each an annular flange, with depressions therein, projecting over the indenturing member to guide an article during indenturing, and frictional driving means connecting the indenturing member and the guiding members.

In witness whereof, I hereunto subscribe my name this 27 day of June A. D., 1923.

CLYDE CONVERSE CARPENTER.